April 9, 1935. L. W. HOTTEL Re. 19,524

MEANS FOR FORMING PLASTIC ARTICLES

Original Filed April 2, 1927 2 Sheets-Sheet 1

Inventor
Louis W. Hottel,

WITNESSES:-
Chas. L. Grossbauer
Emory L. Groff

By Lynn Middleton Donaldson & Hall
Attorney

April 9, 1935. L. W. HOTTEL Re. 19,524

MEANS FOR FORMING PLASTIC ARTICLES

Original Filed April 2, 1927 2 Sheets-Sheet 2

Inventor

Louis W. Hottel,

By Spencer Middleton Donaldson & Hall

Attorney

Reissued Apr. 9, 1935

Re. 19,524

UNITED STATES PATENT OFFICE 19,524

MEANS FOR FORMING PLASTIC ARTICLES

Louis W. Hottel, Los Angeles, Calif., assignor to The Richardson Company, Lockland, Ohio, a corporation of Ohio Original No. 1,652,940, dated December 13, 1927, Serial No. 180,530, April 2, 1927. Application for reissue December 6, 1934, Serial No. 756,375

13 Claims. (Cl. 18—19)

Cross reference is made to applicant's copending application, Serial Number 66,312, filed Nov. 2, 1925, later granted his United States Patent #1,652,991, Dec. 13, 1927, which contains some features of construction of the present application. No claim is made herein to any invention claimed in said earlier application.

This invention relates to a molding press for forming hollow articles from plastic composition and has particular reference to a press construction possessing special utility for the manufacture of electrical storage battery boxes from plastic compositions of the kind that set and harden by cooling as distinguished from those compositions which are hardened or vulcanized by heat; at the same time the press construction being adaptable for utilizing a steam circulating system in connection with the mold chamber and the core to provide for making hollow rubber articles such as battery boxes by pressing and vulcanization.

To that end a primary object of the invention is to provide a novel construction and organization of parts, in a press of the hydraulic type, whereby a battery box or equivalent article can be made economically and rapidly from a suitable acid-proof plastic composition placed in a single mass in the mold and having sufficient plasticity to permit the box or article to be formed by the closing of the mold and a sufficient set or hardening given to the formed box or article by cooling or chilling the same in the mold before the removal of the completed article.

Another object of the invention is to provide a novel mold construction and novel means for actuating and controlling the mold whereby the workmen can with great facility and with a minimum loss of time, place a mass of the plastic composition in position on the core of the mold, close the mold and form the article, open the mold and remove the article and repeat, without tearing down the mold or otherwise interfering with a consecutive operation of the press so that a large production can be obtained on one or a battery of such presses.

With these and other objects in view the invention consists in the novel construction and arrangement of parts hereinafter more fully described, illustrated and claimed, and while the invention necessarily is susceptible of a wide range of modification without departing from the spirit or scope of the invention, a preferred and practical embodiment thereof is shown in the drawings, in which:—

Like reference characters designate corresponding parts throughout the several figures of the drawings.

Figure 1:
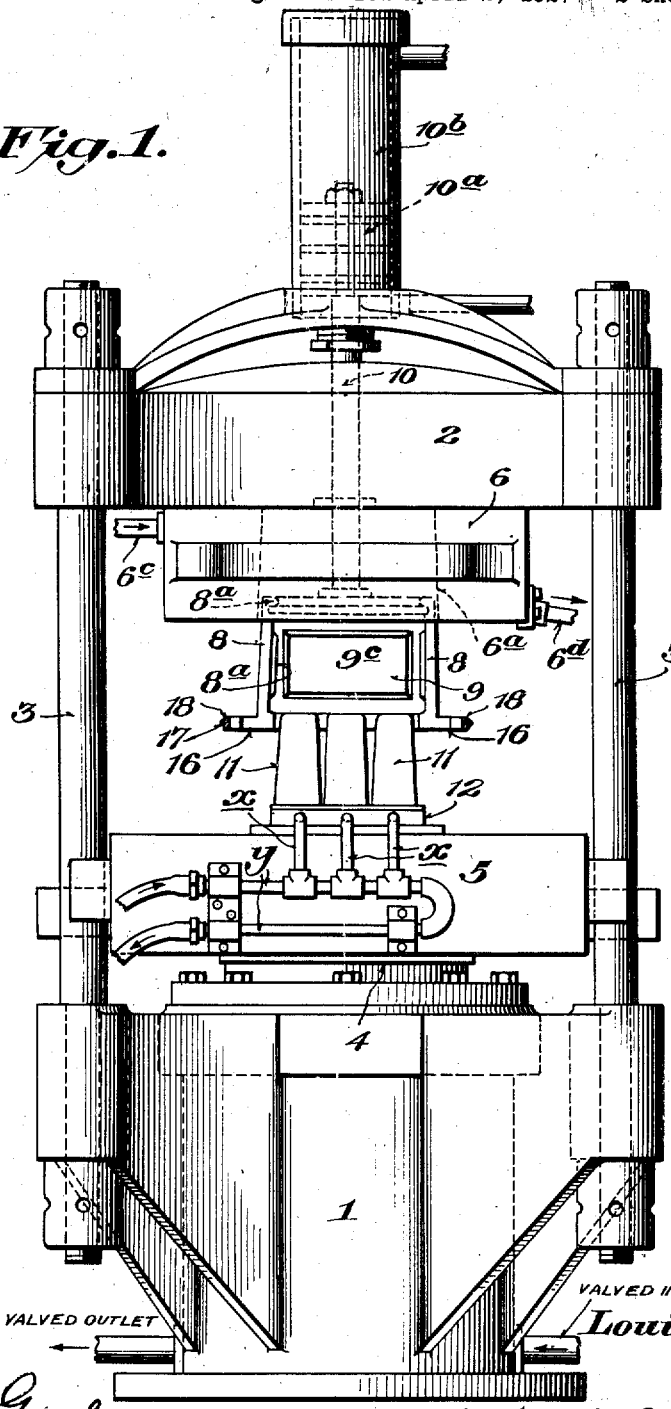
Fig. 1 is a front elevation of a cold molding press embodying the present invention and showing the mold parts separated, the mold suspending rod having reached its lower limit of travel, but the lower platen having a short distance further to travel before completing its downward movement.

In carrying forward the present invention a characteristic feature thereof is to employ a lower power unit, consisting of the ram and its cylinder entirely separate and disconnected from the power unit at the upper part of the press, both of said power units being hydraulically operated in order to facilitate the carrying out of the various operations in the manner herein particularly referred to.

Primarily the invention comprises, in its general organization what may be termed a lower power unit consisting of an ordinary hydraulic ram, and an upper power unit which includes mold suspending means for operating the mold proper which is composed of an articulated group or assembly of mold lining plates. These features of the press construction are operable in the same way regardless of whether the press is worked as a cold press for quick setting plastic compositions, or is a hot press for vulcanizing rubber articles, but for convenience in describing the performance of the press in making a battery box or analogous hollow article the detailed description will be based on the preferable example of employing a cold water circulating system for chilling the press parts.

The mechanism for closing the mold and applying pressure thereto may be of various forms but in the preferred form illustrated consists of a hydraulic press consisting of a cylinder 1 which constitutes the base of the machine, a press head 2 spaced from the cylinder by rods 3, a ram 4 mounted in the cylinder 1 and carrying a lower platen 5 opposed to the press head.

Below the head 2 of the press is rigidly mounted a mold casing or chamber 6 provided with one or more mold cavities 6a extending through the chamber and having tapered walls so that the openings on the lower side are larger than those on the upper side. In the form shown, one of such cavities is present. The mold casing or chamber 6 is preferably of a jacketed construction and provided with suitable connecting cooling chambers or tunnels 6b having cold water inlet and outlet pipe connections 6c and 6d respectively whereby a cooling fluid may be introduced into the jacket of the mold casing or chamber to facilitate the quick setting or partial setting of the box or other article in order that it may be discharged from the mold with facility and without damage thereto.

Figure 2:
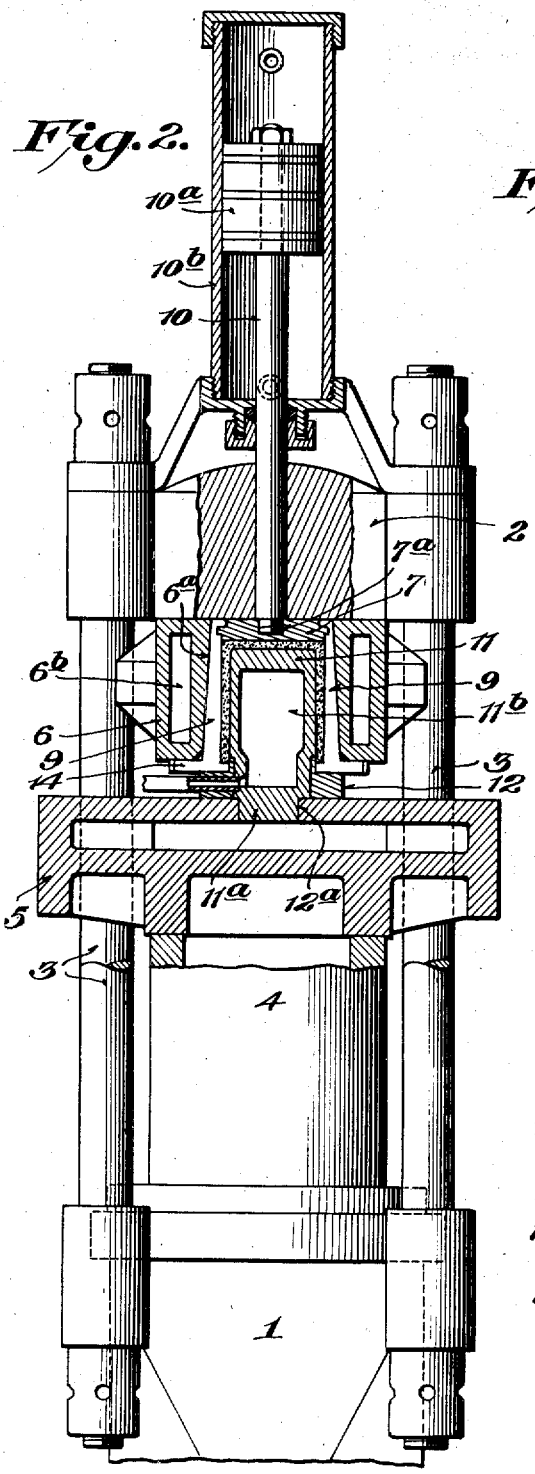
Fig. 2 is a side elevation of the machine with the mold parts in their closed position, said mold parts being shown in section.

The mold consists of a top plate 7, two end plates 8, and two side plates 9, so fitted together that they form a box open on the lower side only and of tapered or equivalent formation outside so that the mold fits tightly in the mold cavity 6a of the mold chamber. The plates 7, 8 and 9 are provided with surfaces suitable for molding the article in the desired configuration and may be changed at will and others substituted therefor. To this end the top plate 7 is provided with a threaded socket 7a for attachment to a correspondingly threaded mold suspending rod 10 connected to piston 10a operating in cylinder 10b. The said top plate 7 is in effect really the bottom plate of the mold, though it occupies the topmost position in the mold structure because of the fact that the articulated mold proper is suspended and controlled from the suspending rod 10. Furthermore, the said top plate 7 may be and preferably is provided with concave rebates 7b around its upper edges, and the end plates 8 and side plates 9 are each provided with corresponding convex shoulders 8a and 9a whereby said end and side plates are loosely suspended from the top plate and are free to swing laterally except when the mold assembly is seated in the mold cavity 6a. This articulation of the mold plate 7 is plainly shown in Figs. 2, 3 and 4 of the drawings and provides the mold proper which freely slides in and out of the mold casing or chamber 6 during the operation of the press.

All of the mold plates may be smooth surfaced or, as shown, provided with raised panels 8c and 9c which impart a paneled appearance to the molded article and also act as dowels to prevent premature relative motion between the mold and molded article.

Where an article such as a battery container is to be provided with integral handles at the ends, the plates 8 are made of such configuration as to provide extensions of the main cavity for this purpose.

For forming the interior of the article, I provide one or more cores rigidly mounted on the lower platen 5 and provided with cooling means. where such an article is to be a multiple celled article I provide a suitable number of such cores 11, three being shown in the drawings. These cores are for convenience made separately and mounted upon a bottom plate 12 designated to cooperate with the mold plates to form a completely closed cavity when assembled. Each core is provided with a shank 11a which is held in a corresponding opening 12a in the bottom plate. In practice I heat the bottom plate and force the shanks 11a into the plate which shrinks thereabout, holding the cores permanently. Each core is provided with cooling cavities 11b and suitable connections $x$ to a cold water line $y$ are provided by flexible or sliding connections.

Figure 5:
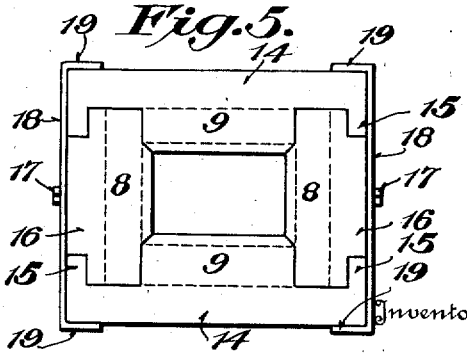
Fig. 5 is a bottom plan view of the mold proper.

Another feature of the invention resides in providing means for temporarily holding the liner plates locked so that they cannot be swung free from the article molded therein when the mold assembly is moved downwardly out of the mold 6. As will be observed from Fig. 5, the side plates 9 are provided with the flange 14 extending along the lower edge of the plates, and said flanges being formed at their ends with the L-shaped hook portions 15 which overlap the end plates 8 so that the latter cannot swing outwardly when the side plates 9 are in place. Secured to the flange 16 of the end plates 8, by means of the pivots 17, are the latch members 18 which are provided at their ends with the keeper hooks 19 which hook over the corners of the flange 14 and thus retain the side plates 9 in such a manner that they cannot swing away from the end plates 8 until the latches 18 are manually released. Therefore, when the mold assembly is lowered out of the mold 6 the L-shaped ends 15 retain the end plates in a closed position, and the ends of the side strips retain the side plates in position.

Having described the structural features of the example shown of the invention reference will now be made to the method of operation and in that connection it will now have been understood that the various mold parts are cooled by the cold water circulating system and the ram 4 is at its lowermost position and the mold suspending rod 10 lifted so as to draw the articulated mold proper or mold lining plates into the mold casing or chamber, ready to receive the mass or charge of plastic composition when the cores are moved upwardly therein by the raising of the ram. When the parts are so positioned, that is, with the ram lowered and the core or cores in the lowermost position, the plastic composition, which previously has been prepared and weighed for approximately the right quantity, is placed on top of the cores so that the same will be carried directly into the mold proper when the cores are lifted. Hydraulic pressure is now admitted to the ram cylinder with the result of raising the cores and carrying therewith the mass of composition which is carried by the cores into the mold proper and caused to flow to the cores and inner surfaces of the mold lining plates with the result of shaping the box or equivalent article as may be plainly seen from Fig. 2 of the drawings.

The cold water circulating about the jacket of the mold casing or chamber and throughout the interior of the cores causes the quick setting or partial hardening of the formed article so that the same can be removed from the mold casing and mold proper.

Figure 3:
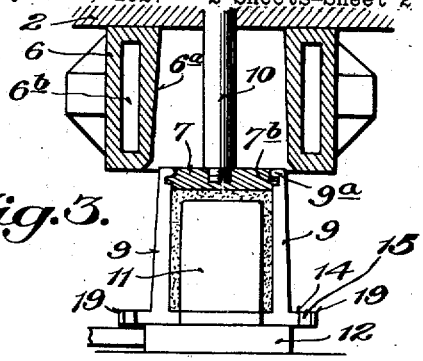
Fig. 3 is a detail view of the mold parts after the mold suspending rod has reached its lower limit of travel and the mold has passed completely out of the mold casing or chamber.

That is accomplished by first releasing the fluid pressure from the lower ram cylinder and from beneath the piston 10a and then applying hydraulic pressure to the upper end of the piston 10a in the cylinder 10b. The effect of relieving the pressure under the ram and applying pressure above the piston 10a is to cause both the ram and the mold to travel downwardly together until the mold with the core therein are completely out of the mold chamber as shown in Fig. 3, the ram, however, being free, from the start downward, to drop by gravity.

By the time the suspended mold reaches its downward limit and is eased from the lateral pressure of its tight fit in the mold core or chamber, the cores 11 will drop by gravity out of the molded article as the ram continues its downward gravitating movement until stopped by the ram cap engaging the top of the cylinder 1. This, the entire downward movement of the core and ram is merely a retreating movement effected by gravity and without sticking.

Figure 4:
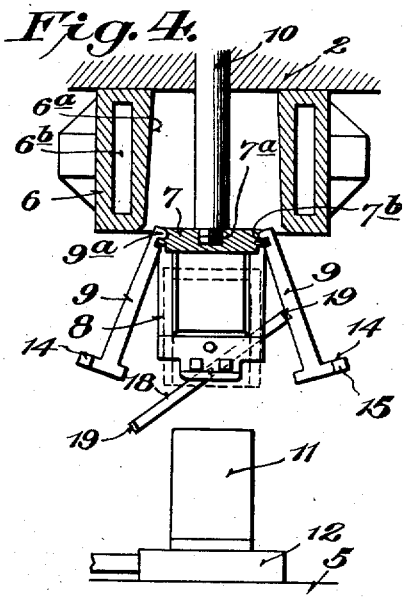
Fig. 4 is a detail view similar to Fig. 3 illustrating the relative position of the mold parts when both the mold suspending rod and the lower platen have fully completed their downward strokes, and the mold has been opened to remove the finished article.

The mold plates are held together by the latches 18 the article will not be accidentally dropped or released from the mold, but when the latches have been moved to the position shown in Fig. 4 the plates are released and the side and end plates of the mold assembly can then be swung sufficiently outward to permit removal of the molded article. Since the molded article is held in the mold due to the mold plates retaining their closed position after leaving the mold chamber 6a, the separation of the cores from the interior of the formed article is effected merely by the relative differential downward movement of the mold parts carried by the suspending rod 10 and the ram from beneath which pressure has been relieved by the opening of the valved exhaust outlet.

When it is desired to repeat the operation for forming the article, the mold plates 8 and 9 are locked together by the latches 18 and the mold assembly is drawn up by putting fluid-pressure beneath into the chamber 6a and the operations of forming heretofore described are again carried out.

In connection with the foregoing operation it should be noted that the cores are preferably slightly tapered to facilitate the operation described, and also to permit atmosphere to enter the articles when the cores are moved slightly in the manner described.

From the foregoing description it will be seen that the isolated and disassociated lower power unit or ram carries the core. Its sole function is to raise or lift the core into the suspended mold and hold the molded article under pressure during the forming. When the fluid pressure is eased or released from the lower cylinder, thereby freeing the ram from its pressure, the ram with the mold core is free to retire under the weight of the ram so that the latter may idle back to its lowered position.

From the foregoing it is thought that the construction, operation and advantages of the herein described cold molding press will be fully understood without further description and it is also to be understood that changes in the form, proportion and minor details of construction may be resorted to without departing from the spirit or sacrificing any of the advantages of the invention.

Having thus described my invention, what I claim as new and desire to secure by Letters Patent, is:—

1. A molding press for hollow articles including a stationary mold chamber, an articulated mold suspended within said chamber, a ram carrying a core operating into and out of the mold, said ram being adapted to release itself from the mold and the article by gravity, and means for lowering the articulated mold to permit removal of the finished article.

2. In a press for molding battery cases, a tapered mold cavity with a mold consisting of a top plate and articulated floating side plates correspondingly tapered and designed to be seated entirely within said cavity with a closing plate having cores, means for forcing said cores into engagement with said mold, and means for raising and lowering said mold.

3. In a mold for battery containers, an end plate, side plates hingedly suspended to the perimeter of said end plate, means to retain said side plates and end plate in engagement with each other, said means having internally heated walls, and a core mold adapted to force a mass of plastic material against the interior surface of said mold plates.

4. In a press for forming plastic articles, a tapered mold cavity, and a mold consisting of a top plate and floating side plates correspondingly tapered and designed to be seated entirely within said cavity with a closing plate having core means, and means for forcing said core means into engagement with said mold.

5. In a mold for battery containers, an end plate, side plates hingedly suspended to the perimeter of the end plate, means to retain said side plates and end plate in engagement comprising a member surrounding the mold throughout a substantial portion of its extent including the zone of hinged suspension of the said plates, said side plates being tapered, and said member correspondingly tapered, and a mold core adapted to force a mass of plastic material against the interior surface of said mold plates.

6. In a press for molding plastic articles, a mold casing having a mold receiving cavity, an articulated mold suspended below said cavity, a closing plate having a core mounted below the mold, means for seating the mold into the cavity and ejecting it therefrom, and means for forcing the closing plate against the mold and for removing it therefrom and pulling the cores from the article.

7. In a press for molding plastic articles, a mold casing having a mold cavity, a mold having a top plate and side plates suspended therefrom, means for seating the mold in the cavity and ejecting it therefrom, a bottom plate provided with a core, and means for forcing said bottom plate against the mold and subsequently removing it therefrom.

8. In a press for molding plastic articles, a mold having a top plate provided with a concave rebate around its edges, side plates each provided with a convex bead for engagement with said rebate, and having their outer sides tapered, a mold casing having correspondingly tapered mold receiving cavity, and means for imparting a limited motion to the mold into and out of the cavity whereby in one extreme position the mold is seated in the cavity in close relation and at the other extreme the side plates can be swung away from the molded article.

9. In a press for molding plastic articles, a stationary platen, a movable platen opposed thereto, and a hydraulic cylinder having a piston member connected to said movable platen, a core mounted on said movable platen, a mold case mounted on said stationary platen, an articulated mold supported in said mold case, said mold having a top plate and a plurality of side plates supported thereby, means on said mold plates for dowelling a molded article to the mold, and means for ejecting the mold from the mold case after the core has been removed from the mold by downward movement of the platen, and thereby releasing the article from the dowelling means.

10. In a machine of the class described, a press ram, a press platen on the upper end of said ram, a container mold core on said platen, an upper stationary press plate above said platen, a flask having a mold receiving recess therein suspended from the under side of said upper press plate, a mold box adapted to fit into said recess, a thrust rod secured to said mold box and extending upwardly through said upper press plate, and cylinder and piston mechanism adapted to operate said thrust rod to draw said mold box into said mold receiving recess and force the same out of said recess.

11. In a mold for battery containers, an end plate for forming the bottom of a battery container, side plates for forming the walls of a battery container, said side plates hingedly suspended to the end plate, a retaining member for retaining the side plates in an erect position, and engaging a substantial portion of the side plates when same are held erect and in molding position, and a core element for said mold, the said core element being tapered with relation to the side plates.

12. In a mold for battery containers, an end plate for forming the bottom of a battery container, side plates for forming the walls of a battery container, said side plates hingedly suspended to the end plate, a retaining member for retaining the side plates in an erect position, and engaging a substantial portion of the side plates when same are held erect and in molding position, and a core element for said mold, the said core element being tapered, and the said retaining member and the side plates tapered correspondingly.

13. In a mold for battery containers, an end plate, side plates hingedly suspended to the perimeter of the end plate, means to retain said side plates and end plate in engagement comprising a member surrounding the mold throughout a substantial portion of its extent including the zone of articulation of the said plates, said side plates being tapered, and said member correspondingly tapered, and a mold core adapted to force a mass of plastic material against the interior surface of said mold plates, pressure means for enforcing relative movement of the core and mold plates while the latter are embraced in the surrounding member to accomplish the molding, and means for enforcing a preliminary separation between two of said three members, to wit, the surrounding member, the mold plates, and the mold core acting through a limited distance, and means whereby the force of gravity operating through an additional distance effects separation of the third member, whereby all three members are separated from each other, permitting a withdrawal of the pressed article from the plates released from the surrounding member.

LOUIS W. HOTTEL.